United States Patent [19]
Wong

[11] Patent Number: 4,782,548
[45] Date of Patent: Nov. 8, 1988

[54] LINEAR-MOTION WIPER STRUCTURE FOR WINDSHIELD AND LIKE SURFACE

[76] Inventor: Edward Y. Wong, F. 6, No. 8, Lane 143, Sec. 3, Thern I Rd., Taipei, Taiwan

[21] Appl. No.: 88,253

[22] Filed: Aug. 24, 1987

[51] Int. Cl.⁴ .............................................. A47L 1/00
[52] U.S. Cl. ............................. 15/250.21; 15/250.27; 74/30
[58] Field of Search ........... 15/250.21, 250.23, 250.27; 74/30

[56] References Cited

U.S. PATENT DOCUMENTS

| | | | |
|---|---|---|---|
| 1,634,460 | 7/1927 | Gray | 74/30 |
| 4,411,165 | 10/1983 | Evans | 74/30 |
| 4,701,971 | 10/1987 | Prohaska | 15/250.21 |

FOREIGN PATENT DOCUMENTS

| | | | |
|---|---|---|---|
| 2417128 | 10/1975 | Fed. Rep. of Germany | 15/250.21 |
| 41501 | 9/1937 | Netherlands | 74/30 |
| 1429807 | 4/1976 | United Kingdom | 15/250.21 |

*Primary Examiner*—Philip R. Coe
*Assistant Examiner*—J. Dwight Poffenberger, Jr.
*Attorney, Agent, or Firm*—Angelo Notaro

[57] ABSTRACT

A linear-motion wiper structure comprising a multistage hydraulic cylinder arm which can be driven by a transmission mechanism having both vertical and horizontal displacement function whereby a blade, which is driven by the arm, can wipe on the windshield in a linear reciprocating motion so as to completely clear the drops of rain on the windshield, and this may provide a clear vision for users who drive in the rain.

1 Claim, 8 Drawing Sheets

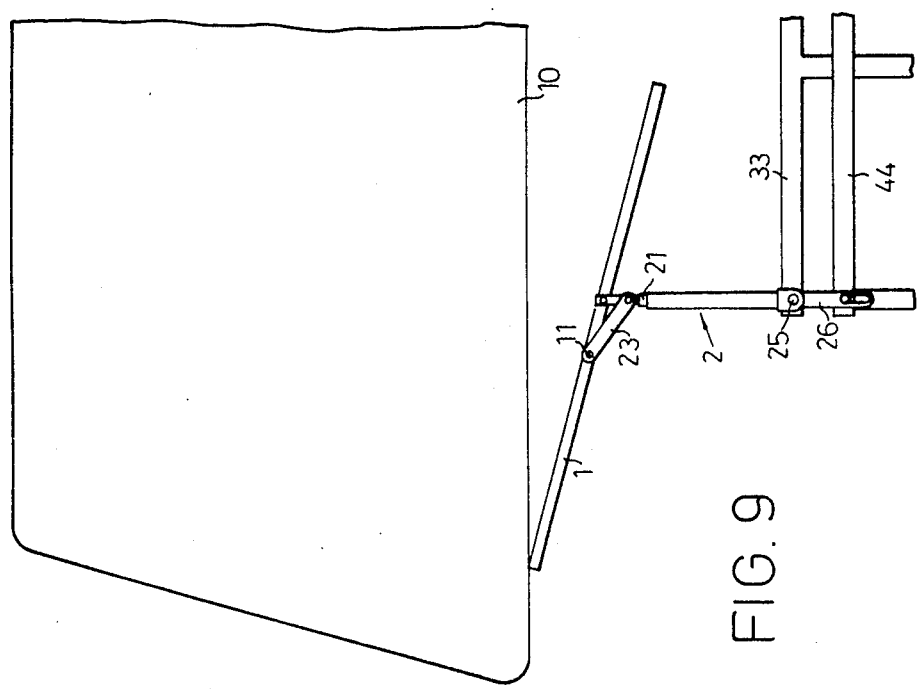

LINEAR-MOTION WIPER STRUCTURE FOR WINDSHIELD AND LIKE SURFACE

BACKGROUND OF THE INVENTION

This invention relates to a linear-motion wiper structure and more particularly to one which can wipe in a linear reciprocating motion by a transmission mechanism possessing both horizontal and vertical displacement function.

Conventional wipers, which can be applied to the bus, truck or car, generally are arranged to wipe in an angular harmonic motion, however the wiping effect thus achieved is limited within a sectoral zone so that such wipers fail to provide an adequately clear vision for users who drive in a heavy storm or in a dusty area.

Further, since the conventional rubber blade of a wiper is arranged to wipe in an angular harmonic motion with different displacement between both ends of the wiper, the torque applied to each point of said rubber blade is different such that the contact surface between the rubber blade and the windshield will be corrugated and this results in a poor wiping effect and causes an undesirable noise. The aforesaid disadvantages will adversely affect the users' mood and thus reduce the driving security.

It is, therefore, an object of the present invention to obviate and mitigate the above-mentioned drawbacks.

SUMMARY OF THE INVENTION

It is the primary object of the present invention to provide a linear-motion wiper structure which can provide a clear vision for the users when driving in the rain so as to increase the driving security.

It is another object of the present invention to provide a linear-motion wiper structure which adapts to different windshields, and the blade of the wiper structure can wipe in a horizontal reciprocating motion on the windshield so as to provide an excellent vision for users.

It is a further object of the present invention to provide a linear-motion wiper structure which can cooperate with a conventional power supply to drive the blade of the wiper structure so as to provide a more practical application.

The invention will now be described in greater detail, by way of example, with reference to the accompanying drawings.

Figures 2, 2A:
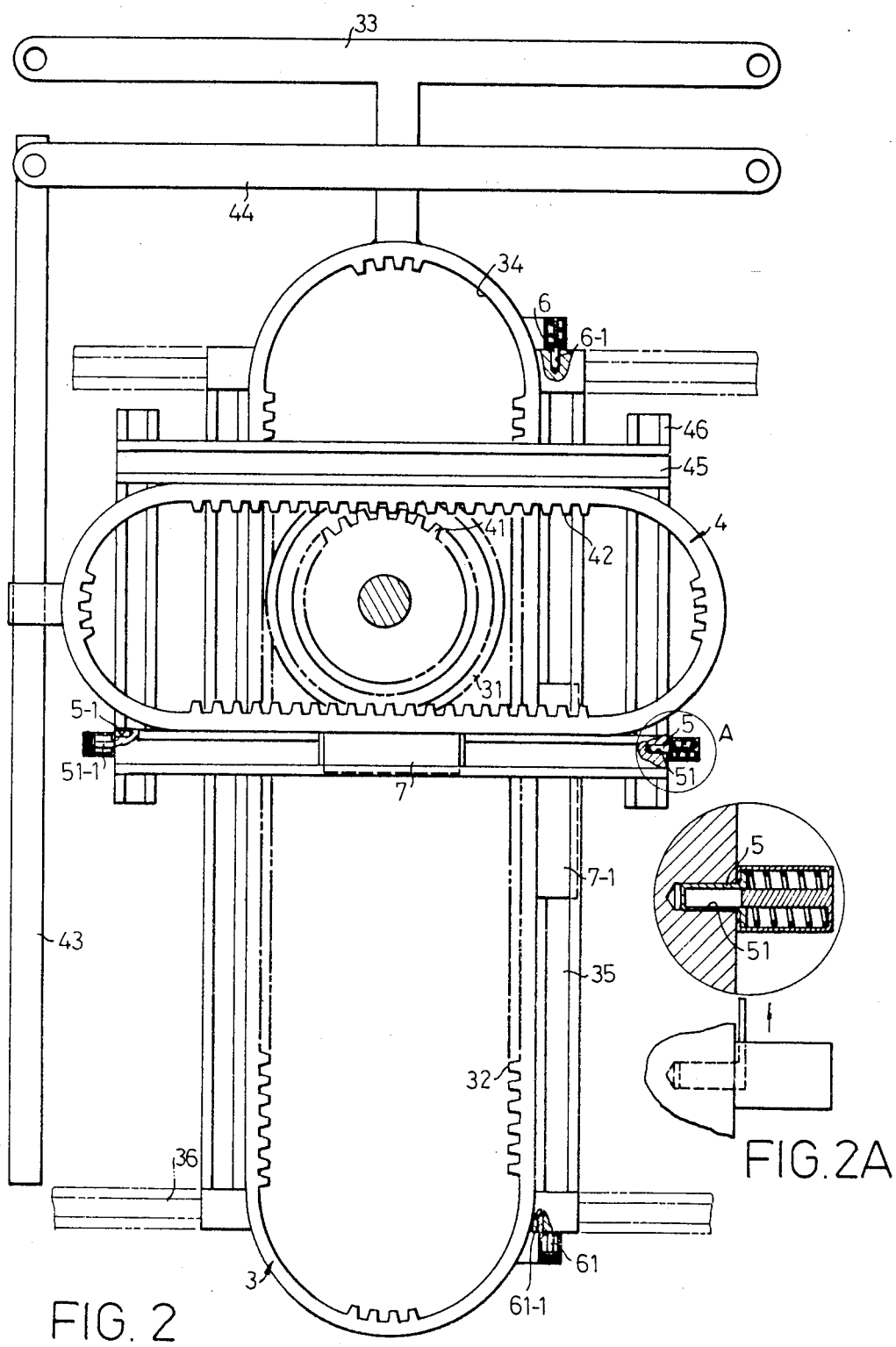
FIG. 2 is a front view of a transmission mechanism according to a preferred embodiment of the present invention.
Figure 6:
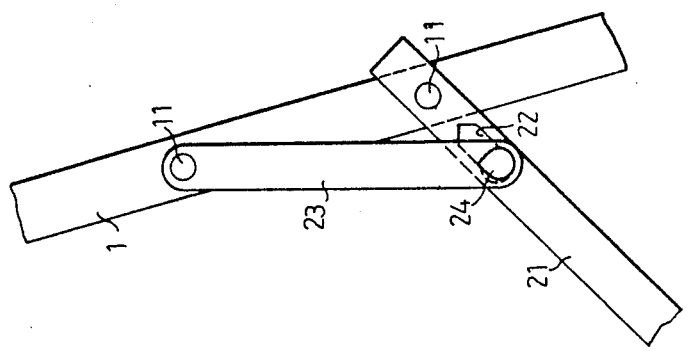
Figure 5:
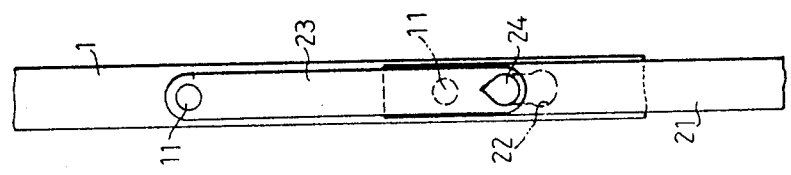
Figure 4:
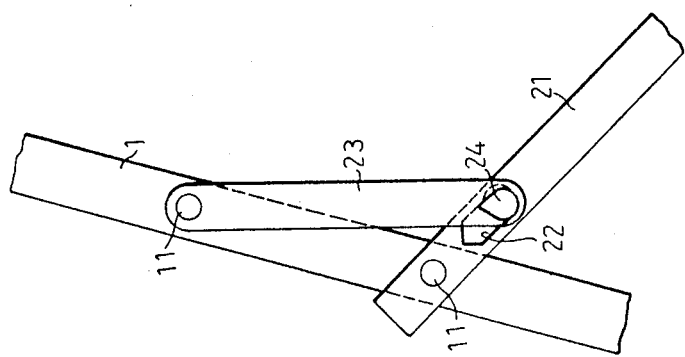
Figure 8:
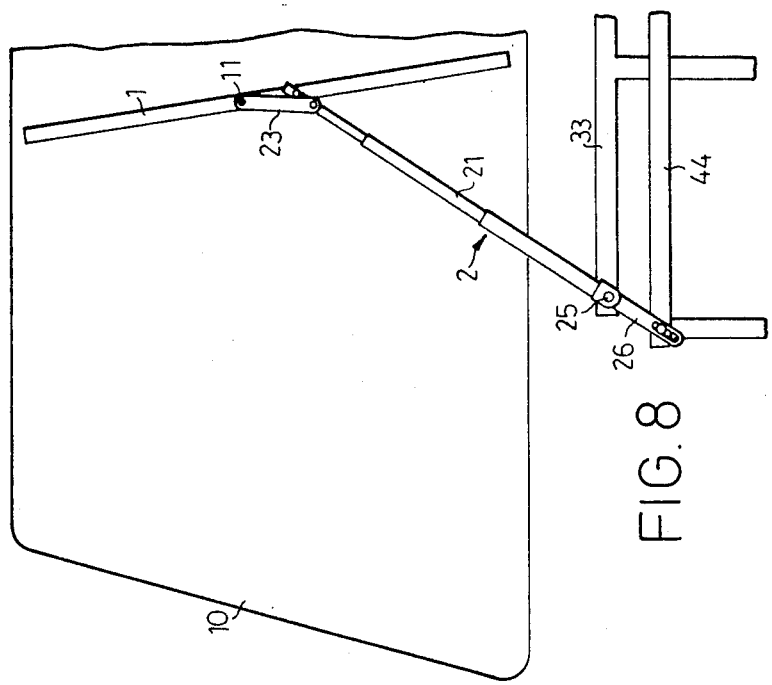
Figure 7:
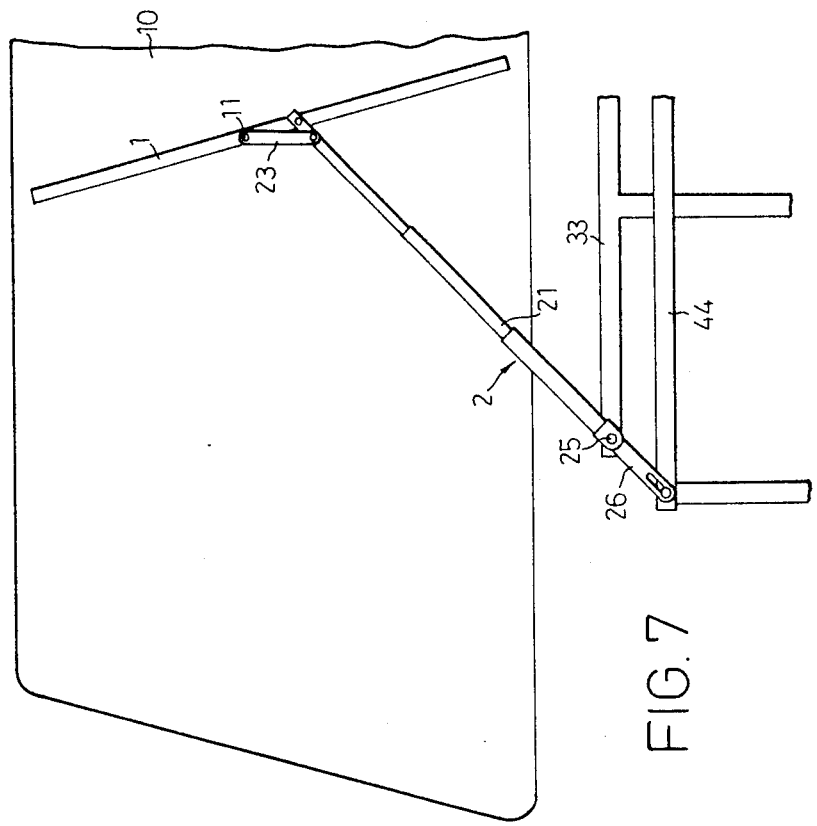

FEG. 3 is a side view of the transmission mechanism as shown in FIG. 2;

FIGS. 4 to 6 are the schematic views thereof respectively showing the motion of the blade structure;

FIGS. 7 to 9 are the schematic views thereof respectively illustrating the retractation and stretch of the ARM2 structure as shown in FIGS. 4 to 6; and FIGS. 10 to 13 are the schematic views thereof respectively illustrating the motion of the ARM2 structure.

DETAILED DESCRIPTION OF THE PREFERRED EMBODIMENT

Figure 1:
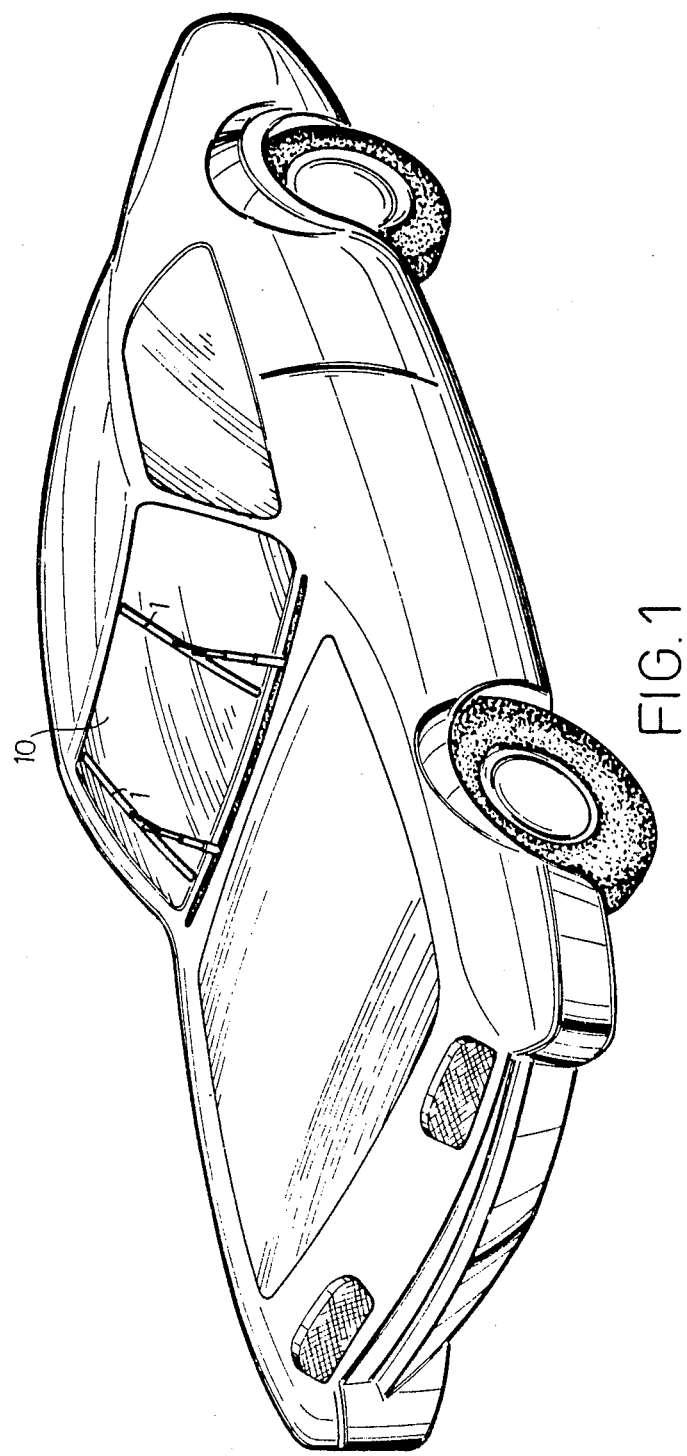
FIG. 1 is a perspective view of a wiper structure associated with a car according to a preferred embodiment of the present invention.
Figure 3:
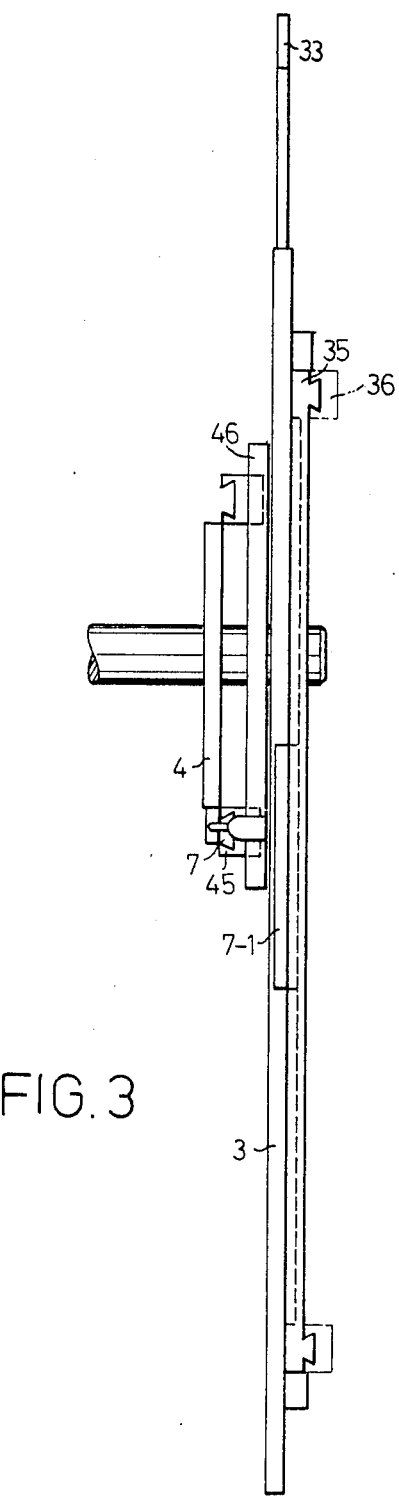

Referring to FIGS. 1 TO 3, a linear-motion wiper structure is arranged to wipe on the windshield 10 of a car in a linear reciprocating motion so as to completely clear said windshield and leave no uncleared portions when driving in the rain to increase their driving security.

The wiper structure according to a preferred embodiment of the present invention comprises a blade 1, an arm 2, a vertical transmission mechanism 3 and a horizontal transmission mechanism 4. The blade 1 is provided about its center with a pair of upper and lower pivots 11.

The arm 2 is a multistage hydraulic cylinder of which a piston 21 is pivotally connected at one end to said lower pivot 11. The piston 21 of the arm 2 is provided with a sliding groove 22 in which a tongue 23 is properly disposed. One end of said tongue 23 is connected to a stop 24 and the other end thereof is pivotally connected to said upper pivot 11 whereby the blade 1, when driven by said piston 21, will wipe on the windshield in a linear reciprocating motion with the aid of the stopping function furnished by the stop 24 associated with the sliding groove 22, in spite that the piston 21 either intersects the blade 1 at an angle or coincides with said blade 1. However, it should be noted that only when the arm 2 is coincident with the tongue 23 the stop 24 can move along the groove 22 upwards or downwards. The tongue 23 will not move up and down along said sliding groove 22 until said arm 2 rotates to a position perpendicular to said tongue 23 so as to prevent the blade angle from being changed in advance. The sliding groove 22 of the arm 2 is used to limit the angle variation of the tongue 23, as shown in FIGS. 4 to 6, to keep the blade 1 either in a vertical state or within a predetermined angle range. The arm 2 further is provided with a supporting point 25 and a supporting arm 26 extending from said supporting point.

The sliding vertical transmission mechanism 3 comprises a motor (not shown) which is arranged to drive a gear 31 which, in turn, drives a vertical sliding gear rack 32 which can move up and down along the sliding groove.

The vertical sliding gear rack 32 is mounted on a sliding plate 35 which can move left and right. The vertical sliding gear rack 32 further drives a link 33 to make said link 33 synchronously move with said sliding gear rack 32 in a vertical direction. Each end of the link 33 is secured to the supporting point 25 of each arm 2 whereby as the link 33 moves up and down, the arm 2 will move up and down accordingly. When the sliding gear rack 32 moves downward and reaches the lower limit, the gear 31 happens to contact with the non-tooth portion (34) of said sliding gear rack 32, and moves the sliding plate 35 so that the gear 31 again contacts the other side of said sliding gear rack 32 to achieve the purpose of reversing direction. Then, the sliding gear rack 32 can change the moving direction to move upward. When the sliding gear rack 32 reaches the upper limit, said sliding gear rack can, in a similar manner, reverse its moving direction to again move downward. Such procedure will repeat during the normal operating period.

The horizontal transmission mechanism 4 comprises a gear 41 which is arranged to be driven by the same motor used for said vertical transmission mechanism 3.

Said gear 41, in turn, drives a horizontal sliding gear rack 42. The horizontal sliding gear rack 42 then will drive a rod 43 to move in a horizontal direction (The sliding gear rack 42 also is mounted on a sliding plate 45 which can move up and down, and the direction reversing process of said sliding gear rack 42 is identical to that of said veritical transmission mechanism). The rod 43 can, in turn, drive a transverse rod 44 to move in a horizontal direction. Each end of the transverse rod 44 is pivotally connected to the supporting arm 26 of each of the arm 2 to move in a horizontal direction while the link 33 drives the arm 2 to move in a vertical direction such that the blade 1 can wipe on the windshield in a swinging motion.

Referring to FIGS. 7 to 9, when the switch is turned off, the motor will move the arm 2 to a top position (as shown in FIG. 7). Then, at the instant position, the hydraulic cylinder arm 2 begins to retract. When the arm 2 retracts to a predetermined position as shown in FIG. 8, the motor again will be actuated. (This can be achieved by utilizing a conventional delay circuit or microswitch). The motor will be turned off when said arm 2 also retracts to its shortest length, as shown in FIG. 9. Such procedures can be reversed when the blade is to be used in clearing the windshield. The switch, which is used to control the rotation of the motor, is a reversible switch. By using such a reversible switch, whenever said motor will be opposite to its previous rotating direction such that the blade can always move in a vertical or quasi-vertical motion.

Figure 11:
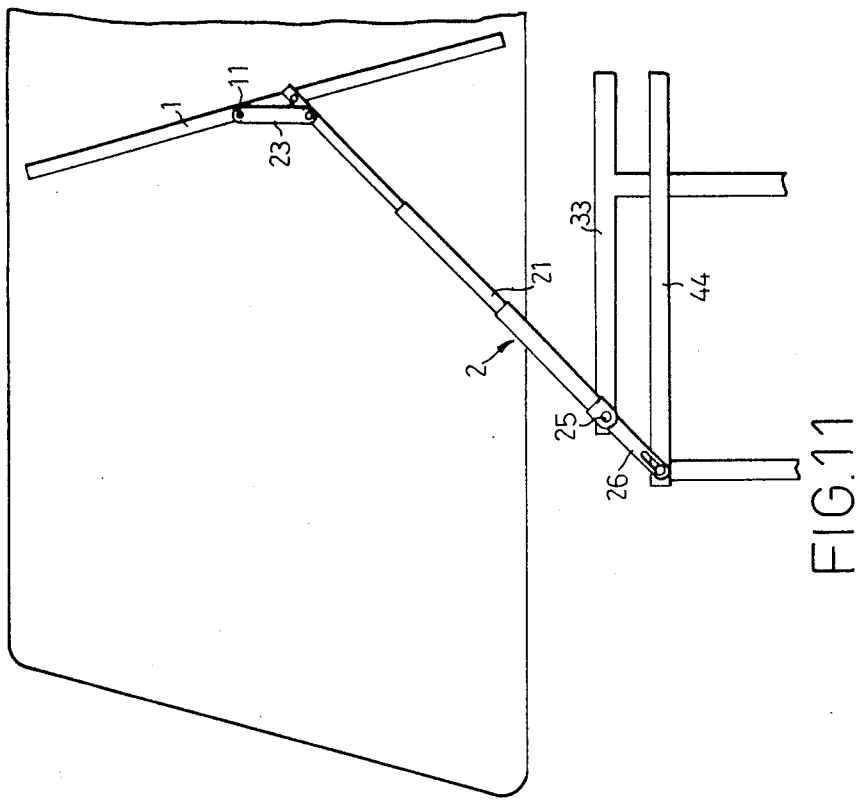
Figure 10:
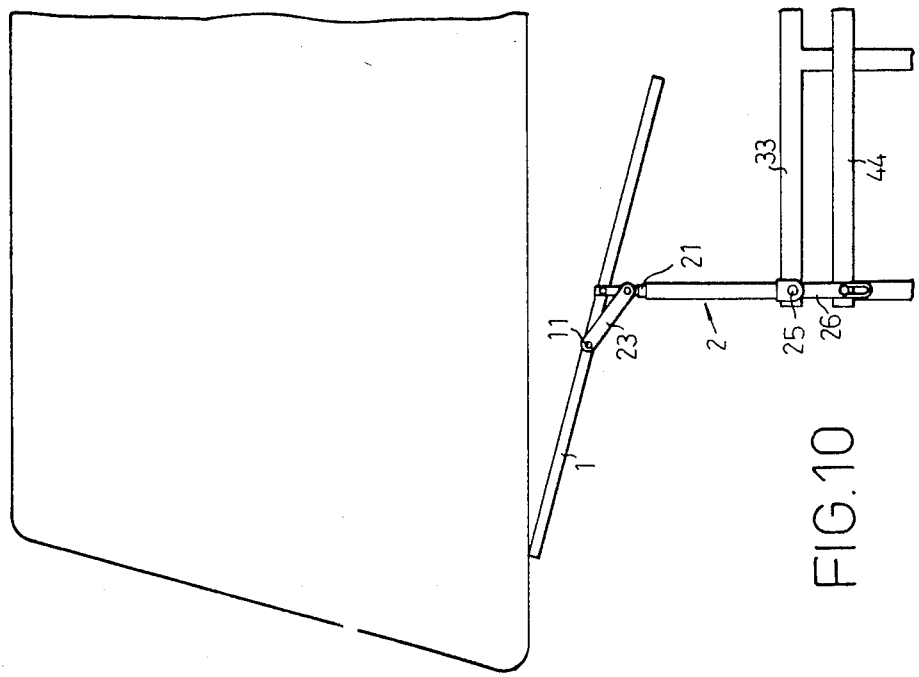

The initial positions of the blade 1 and the associated transmission mechanisms 3 and 4, at To, are shown in FIG. 10 wherein the blade 1 is in its unused state. In operation, firstly, the switch for controlling the hydraulic cylinder arm 2 is actuated and then the blade 1 can be driven by the piston 21 (to a position as shown in FIG. 11). At this instant, the motor will simultaneously drive the gears 31 and 41 which, in turn, respectively drive the gears rack 32 and 42 thereby the link 33 and the transverse rod 44 can simultaneously drive the arm 2 to move in both vertical and horizontal directions (in swinging motion). That is, when the transverse rod 44 drives the supporting arm 26 to make the arm 2 moved, the link 33 also will drive the supporting point 25 downwardly to make the arm 2 swung such that the top of said arm will move along a horizontal path to keep the blade wiping in a linear reciprocating motion.

Figure 13:
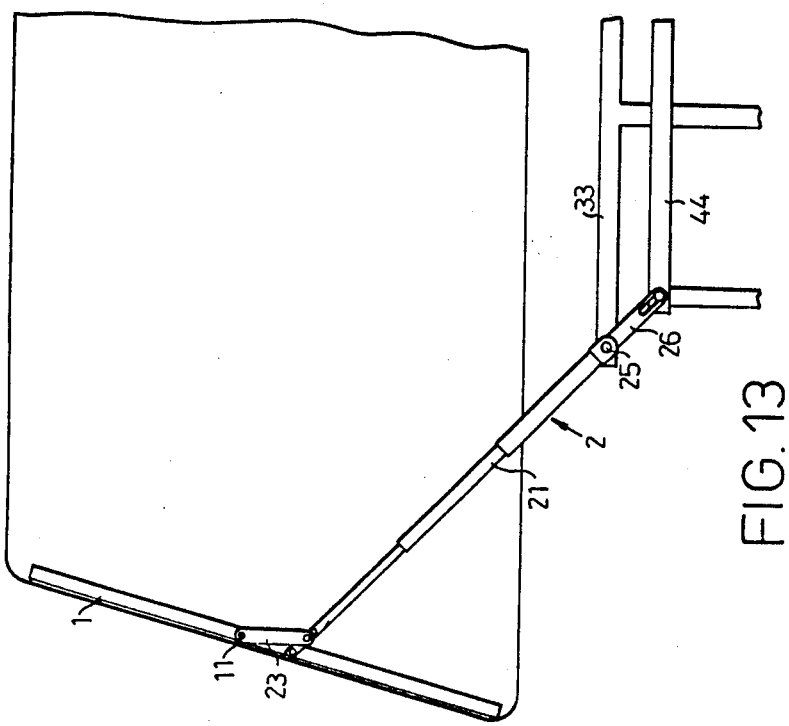
Figure 12:
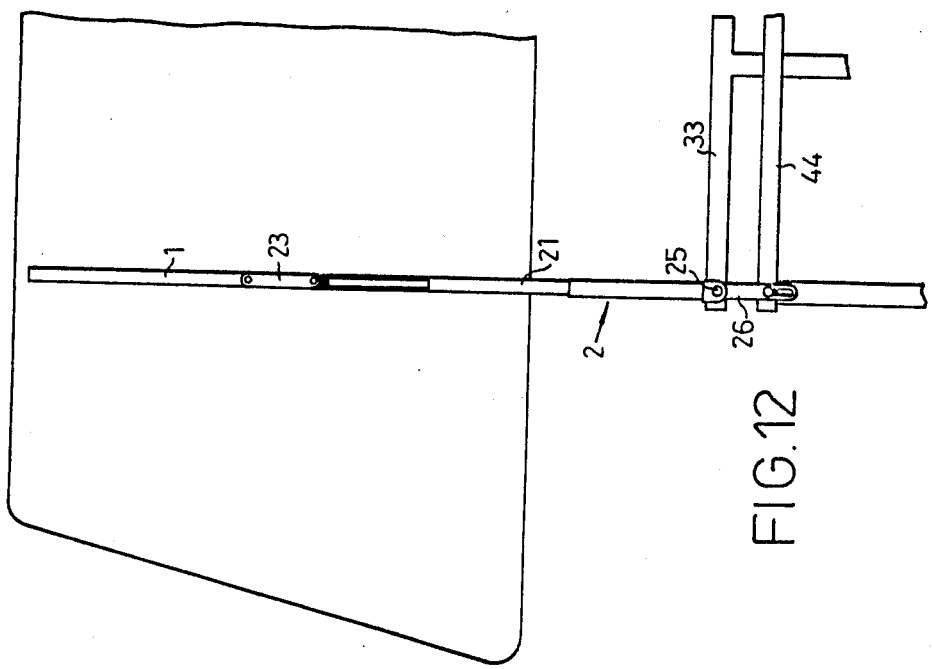

Referring to FIG. 12, the link 33, at T2, locates at its lower limit (In FIG. 11, the link 33, at T1, locates at its uppe limit), and the blade 1 coincides with the arm 2. At T3, the arm 2 swings to its left most position and the supporting point 25 thereof rises up to its upper limit as shown in FIG. 13, Such reciprocating motion may completely clear the windshield and will leave no uncleared portions thereon.

Referring to FIGS. 2 and 3, said transmission mechanisms are provided with two pairs of pivot pins 5,5-1, and 6, 6-1 respectively to fix the sliding plate 35, 45 in position. When the gear racks 32 and 42 respectively move to their upper/lower or leftmost/rightmost limits, one of each pair of pivot pins 5,6 will be shifted from the pin holes (51)(61) by said flanges (7) (7-1) respectively mounted on gear racks 32 and 42 to release sliding plates 35, 45 and let them respectively move along sliding grooves 36,46. As the sliding plates 35, 45 respectively reach their leftmost/rightmost or upper/lower limits, the other one of each pair of pivot pins 5-1, 6-1 will fall in the pin hole 51-1 61-1 to fix the sliding plate 35, 45 again and make gears 31,41 securely contact the other side of each of said horizontal and vertical gear racks 32,42 to achieve the purpose of reversing direction. When the gear rack 32, 42 respectively contact their upper/lower or leftmost/rightmost limits, the pivot pin will return to its initial position to effect the positioning function.

Conclusively, the instant linear-motion wiper structure possesses both novelty and practicability, and it can completely achieve the expected purpose. Hence, the present application indeed is a progressive and novel invention.

I claim:

1. A linear-motion wiper structure comprising:

a pair of blades each having a center and each being provided about its center with first and second pivots;

a pair of arms each being a multistage hydraulic cylinder with a piston which is pivotally connected to said second pivot of a respective one of said pair of blades, said piston of each arm having a slide groove, a tongue for each piston, each tongue having one end with a stop engaged in said slide groove of one piston, each tongue having another end pivotally connected to said first pivot of one of said pair of blades, each arm having one end with a supporting point, a supporting arm extending downwardly from said supporting point of each arm;

a vertical transmission mechanism having a motor, a gear connected to be driven by said motor, a vertical gear rack engaged with said gear to be driven by said gear and a link connected to said vertical gear rack, said link having opposite ends each pivotally connected to said supporting point of one of said pairs of arms respectively; and a horizontal transmission mechanism, a further gear connected to be driven by said motor, a horizontal gear rack engaged with said further gear and driven horizontally by said further gear, a vertical rod connected to said horizontal gear rack for horizontal movement therewith, a transverse rod connected to said vertical rod and extending substantially parallel to said link, said transverse rod being pivotally connected to each supporting arm;

whereby said arm is driven by said link to move up and down in a vertical direction, each supporting arm being simultaneously driven by said transverse rod to move back and forth in a horizontal direction, said vertical and horizontal gear racks being structured so that the frequency of vertical movement is twice that of horizontal movement so that each blade is driven by the arm to wipe a windshield in a linear reciprocating motion.

* * * * *